United States Patent [19]

Schriever et al.

[11] Patent Number: 4,526,641

[45] Date of Patent: Jul. 2, 1985

[54] METHOD OF MAKING PEELABLE NON-METALLIC SHIMS

[75] Inventors: Matthias P. Schriever, Kent; Chun-Ming Wong, Seattle, both of Wash.

[73] Assignee: The Boeing Company, Seattle, Wash.

[21] Appl. No.: 529,785

[22] Filed: Sep. 6, 1983

Related U.S. Application Data

[62] Division of Ser. No. 349,561, Feb. 17, 1982.

[51] Int. Cl.³ ............................................. B32B 31/18
[52] U.S. Cl. .................................... 156/247; 156/248; 156/268; 156/344; 308/244; 428/473.5
[58] Field of Search ............... 156/247, 248, 257, 268, 156/344, 304.5, 306.9, 307.1, 313; 188/201; 308/244; 428/473.5

[56] References Cited

U.S. PATENT DOCUMENTS 2,124,866  7/1938  Young ................................. 308/244
3,852,137  12/1974  Balke et al. ...................... 428/473.5

Primary Examiner—Caleb Weston
Attorney, Agent, or Firm—Bernard A. Donahue; Morris A. Case

[57] ABSTRACT

A laminate of a plurality of thermosetting resin films are joined together with a thermosetting resin to impart a peel strength between films of about 1 to 3 pounds per inch of width.

2 Claims, 5 Drawing Figures

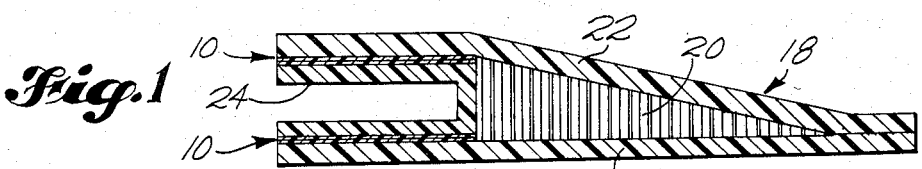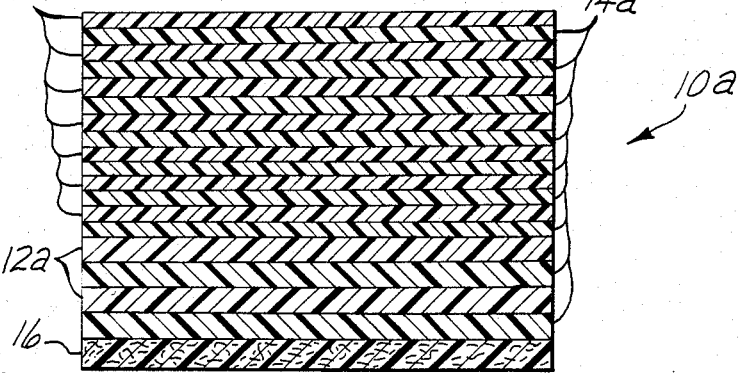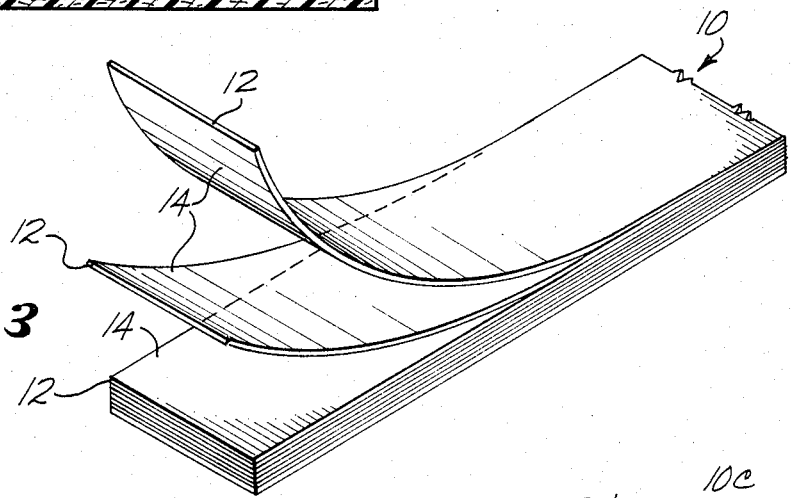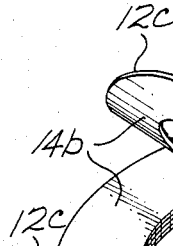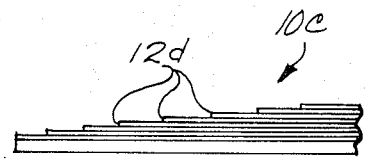

METHOD OF MAKING PEELABLE NON-METALLIC SHIMS

This is a division of application Ser. No. 349,561, filed Feb. 17, 1982.

BACKGROUND OF THE INVENTION

Shim stock is used extensively throughout industry to fill a space between mating parts for structure. Different thicknesses of shim stock are often needed on a job, and to fill this need there are available peelable aluminum and peelable stainless steel shims. To fill the need for different amounts of space between parts, the peelable shims may be peeled down to the desired thickness and used to fill the void. Often the peelable shim stock needs to be machined, punched, or otherwise shaped before it reaches the one that will put it to use. The shim stock must be able to withstand these operations without delaminating, and yet be readily peelable to provide the proper thickness in use.

There has been a rapid rise in composite structures for use in aircraft due to the ratio of strength to weight in the composites. The composite structures also require the use of peelable shims, but unfortunately aluminum reacts with graphite, which is one of the most used reinforcing materials for composites. It was found that a non-metallic peelable shim can be used that does not react, is readily machineable without delaminating and is readily peelable for obtaining the correct thickness for specific use.

SUMMARY OF THE INVENTION

A lamination with layers of a thermosetting resin film is held together with resin between layers of film that is of a thickness of from about 0.0003 inches up to the thickness of the film to provide a peel strength of about 1 to 4 pounds per inch of width of the shim stock.

DESCRIPTION OF THE DRAWINGS

FIG. 1 shows a side elevational sectional view of a composite structure using peelable non-metallic shims of this invention.

FIG. 2 shows a blown-up side elevational, sectional view of a typical peelable non-metallic shim of this invention.

FIG. 3 shows a perspective view of the peelable non-metallic shim of this invention with layers being peeled off.

FIG. 4 shows a perspective view, of the peelable non-metallic shim of this invention, that is formed by machining.

FIG. 5 shows a side elevational view, of the peelable non-metallic shim of this invention, that is tapered.

DETAILED DESCRIPTION

A peelable non-metallic shim 10 is made up of a plurality of thermosetting resin films 12 that are bonded together with a layer of a thermosetting resin 14 between each of the films. The films are preferably made of a polyimide such as, but not limited to, Kapton Type H, which is a film material sold by Du Pont, and is made from the poly-condensation reaction between pyromellitic dianhydride and aromatic diamine. The thermosetting bonding resin layer may be prepared with a polyester, an acrylic or a cyanoacrylate resin. The layer of adhesive or bonding resin has a layer thickness varying from about 0.0003 inches up to the thickness of the film being bonded. The resin layers are best shown in FIG. 2. In that blown-up view showing one embodiment of this invention a sheet of a thermosetting resin 16, which is of a phenolic resin, serves as a base. The sheet is joined by a bonding resin 14a, to a series of polyimide films 12a. The top film in turn is bonded by the resin 14a, to a series of thinner polyimide films 12b. In the embodiment as shown in FIG. 3 all the films are of a uniform thickness.

To form a peelable non-metallic shim 10b, such as is shown in FIG. 4, a plurality of polyimide films 12c are selected that have the required thickness. A resin adhesive coating 14b is placed between adjacent sides of the films, the covered films placed one on top of the other, and the unit subjected to pressures of from about 100 p.s.i. up to about 200 p.s.i., and the unit while under pressure is subjected to curing temperature. When the polyester resins are used for the adhesive they are preferably subjected to about 180° F. up to about 250° F. for about one hour minimum while under the pressure. If a cold bond is being used, and the cold bonding is preferred, the curing takes place at a temperature no higher than about 100° F. The formed peelable shim, which has a peel strength of from 1 to 4 pounds per inch of width, may now be subjected to various machining methods to the desired shape without delaminating; while the film layers may be readily peeled back as shown.

FIG. 1 shows a peelable non-metallic laminate 10, in use as a shim material for a composite structure 18. That structure is made up of a shaped non-metallic honeycomb core 20, and a pair of cover layers 22 of graphite reinforced epoxy resin that is cured to shape, and a cured to shape graphite reinforced U-shaped support member 24; they are joined together after first determining the thickness of shim material required to fill the void. The shim is then peeled as required to provide the proper thickness, and the two parts are joined together.

Should the void between parts require a tapered shim 10c as is shown in FIG. 5, the polyimide film 12d is scribed at the location where a step is required and the film peeled back to the scribed mark and torn off. The scribing, peeling and tearing is repeated as required to impart the desired taper to the shim. The shim may be tapered on either or both sides as required to impart tapered and/or wedge shapes. This capability of the peelable non-metallic shim to be shaped at installation means it often lends itself to use in place of peelable metallic shims as well as for non-metallic use.

We claim:

1. A method of preparing a shaped shim, with steps comprising: determining the required shape for a shim to fill a void between structural members; selecting peelable shim stock of a laminate of polyimide films adhered together with a peel strength of 1 to 4 pounds per inch of width; scribing the polyimide film; peeling back the film and tearing it off at the scribed mark; and repeating the scribing, peeling and tearing thereby imparting a taper to the surface.

2. A method of preparing a shaped shim as in claim 1, with further steps comprising scribing, peeling and tearing from an opposite side of the peelable shim for tapering the opposite side to fit the shim to the void.

* * * * *

Disclaimer and Dedication 4,526,641.—*Matthias P. Schriever*, Kent; *Chun-Ming Wong*, Seattle, both of Wash. METHOD OF MAKING PEELABLE NON-METALLIC SHIMS. Patent dated July 2, 1985. Disclaimer and Dedication filed June 26, 1989, by the assignee, the Boeing Co.

Hereby disclaims and dedicates to the Public the entire term of said patent.
[ *Official Gazette September* 12, 1989 ]